(12) United States Patent
Lee

(10) Patent No.: US 6,762,804 B2
(45) Date of Patent: Jul. 13, 2004

(54) REFLECTIVE-TYPE LIQUID CRYSTAL DISPLAY AND METHOD FOR MANUFACTURING THE SAME

(76) Inventor: Ming-Kuei Lee, No. 6, Sec. 2, Datung Rd., Dungshr Tsun, Neipu Shiang, Pingtung (TW), 912

( * ) Notice: Subject to any disclaimer, the term of this patent is extended or adjusted under 35 U.S.C. 154(b) by 0 days.

(21) Appl. No.: 10/306,227

(22) Filed: Nov. 29, 2002

(65) Prior Publication Data

US 2004/0036824 A1 Feb. 26, 2004

(30) Foreign Application Priority Data

Aug. 26, 2002 (DE) ...................................... 202 13 073 U

(51) Int. Cl.$^7$ ................................................ G02F 1/13
(52) U.S. Cl. ...................................................... 349/45
(58) Field of Search ............................. 349/45; 257/59

(56) References Cited

U.S. PATENT DOCUMENTS

| | | | | |
|---|---|---|---|---|
| 5,499,124 A | * | 3/1996 | Vu et al. ....................... | 349/45 |
| 6,020,598 A | * | 2/2000 | Yamazaki ..................... | 257/59 |
| 6,583,844 B1 | * | 6/2003 | Mishima et al. ............ | 349/149 |

* cited by examiner

Primary Examiner—James A. Dudek
(74) Attorney, Agent, or Firm—Rosenberg, Klein & Lee

(57) ABSTRACT

The present invention discloses an improved system integrated reflective-type liquid crystal display (SIRLCD) and a method for manufacturing such a SIRLCD, in which a conductive plug is disposed on each of a plurality of pre-determined positions on a substrate so as to form an interface module for connecting an optical module by using well-developed LCD manufacturing processing and a control module by using well-developed semiconductor manufacturing processing, independently, thereby improving the product yield and reducing the fabrication cost.

21 Claims, 10 Drawing Sheets

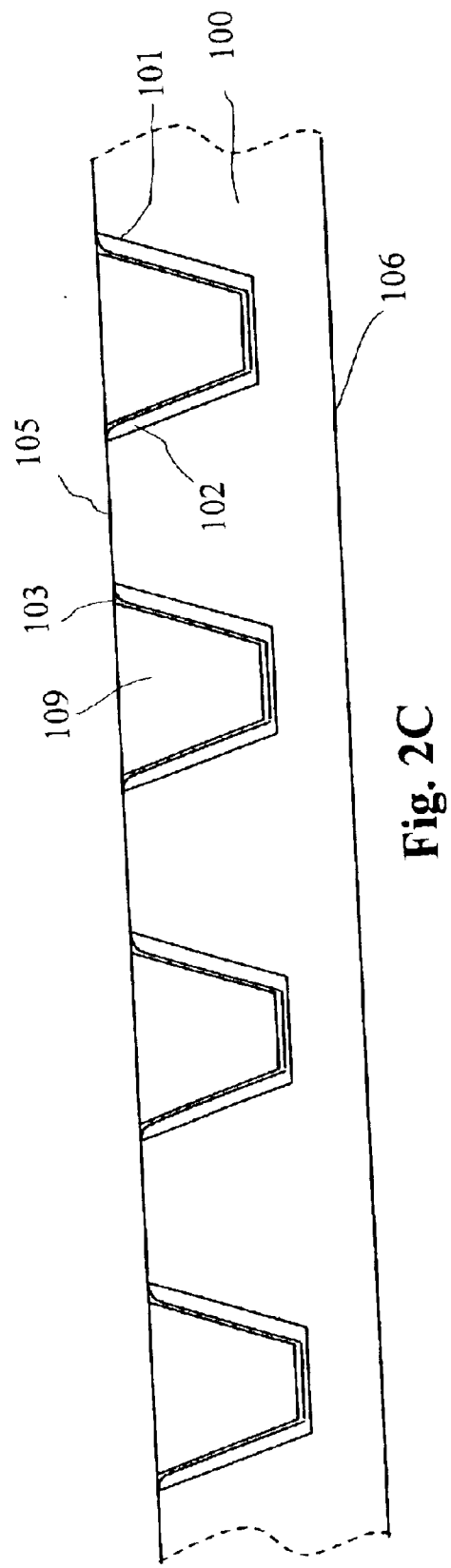
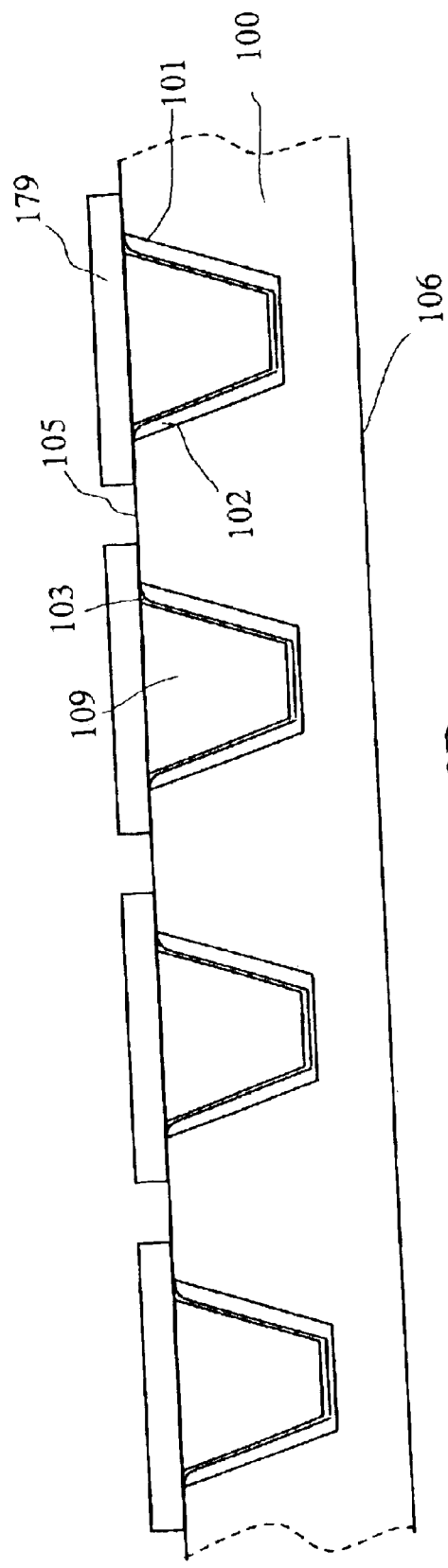
Fig. 2C
Fig. 2D

REFLECTIVE-TYPE LIQUID CRYSTAL DISPLAY AND METHOD FOR MANUFACTURING THE SAME

BACKGROUND OF THE INVENTION

1. Field of the Invention

The present invention generally relates to a reflective-type liquid crystal display and a method for manufacturing the same and, more particularly, to a system integrated reflective-type liquid crystal display (SIRLCD) and a method for manufacturing such a SIRLCD, in which a conductive plug is disposed on each of a plurality of pre-determined positions on a substrate so as to form an interface module for connecting an optical module by using well-developed LCD manufacturing processing and a control module by using well-developed semiconductor manufacturing processing, independently, thereby improving the product yield and reducing the fabrication cost.

2. Description of the Prior Art

Recently, with the high development in opto-electronics and semiconductor manufacturing processing, people have increasing needs for high-resolution displays such as LCD's. Therefore, the industry has developed a liquid crystal on silicon (LCOS) display with high resolution by combining a liquid crystal optical module for display and a semiconductor integrated circuit (IC) for control.

In FIG. 1, a cross-sectional representation of a conventional LCOS display or a SIRLCD is shown. A starting semiconductor structure has an upper layer of silicon (Si) and is understood to possibly include a semiconductor substrate 10, active devices such as metal-oxide-semiconductor (MOS) transistors and passive devices such as capacitors. One of the MOS transistors includes a drain 18, a source 20 and a gate electrode 16 formed on a gate oxide 14. The MOS transistor is isolated from adjacent semiconductor devices by isolating regions 13. Moreover, one of the capacitors with a bottom electrode 22 is formed on the isolating region 13. A dielectric layer 19 is formed on the bottom electrode 22, and then a top electrode 17 is further formed on the bottom electrode 22. A first insulating layer 21 is formed of silicon dioxide covering the transistor and the capacitor on the substrate 10 so as to protect and isolate the electronic devices.

After the formation of the first insulating layer 21, openings are formed by etching the insulating layer at the positions of the drain 18, the source 20 and the top electrode 17 so as to form contacts 45, 55 and 25 connected to the drain 18, the source 20 and the top electrode 17, respectively, by filling the opening with conductive materials such as titanium, titanium nitride, tungsten and aluminum. Conductive wires 63 and 64 are formed of metal deposited and patterned on the first insulating layer 21. The conductive wire 64 is connected to the drain 18 through the contact 45, while the conductive wire 63 is connected to the source 20 and the top electrode 17 through the contact 55 and 25, respectively.

A second insulating layer 23 is formed covering the conductive wires 63 and 64 on the first insulating layer 21. A light-shielding layer 77 is formed on the second insulating layer 23 comprised of metal materials such as titanium, titanium nitride and tungsten, thereby shielding or absorbing the diffracted light and preventing the diffracted light from affecting or interfering the MOS transistors and capacitors because of the photoelectric effect. After the surface of the light-shielding layer 77 is covered by a third insulating layer 71 formed of silicon dioxide, pixel electrodes 79 are disposed on corresponding pre-determined positions on the surface of the third insulating layer 71. One of the pixel electrodes 79 is electrically connected to the corresponding conductive wire 63 through the via 35.

A protective layer 36 is formed on the pixel electrodes 79 not only to protect the pixel electrodes 79 but also to enhance light reflection. A liquid crystal module is disposed on the protective layer 36 to comprise at least one liquid crystal layer 30 sandwiched between alignment films 33 and 37. A transparent electrode 38 is provided on the alignment film 37, on which a transparent substrate 40 is formed so as to protect the liquid crystal module.

However, in the aforementioned LCOS display, if only a protective layer 36 is disposed on the pixel electrodes 79, it is very likely that a notch may be formed between the pixel electrodes 79. In addition, the alignment film 33 on the protective layer 36 may also affect the alignment of liquid crystal molecules because the alignment film 33 is not sufficiently flat. Those who are skilled in the art manage to fill the gap with filler made of dielectric materials 73 between the pixel electrodes 79 and perform chemical mechanical polishing (CMP) so as to flatten the surface of the pixel electrodes 79. However, the use of CMP is very likely to form disk-shaped hollows near the center and the edge portions, which results in insufficient flatness for optics and thus reducing the light-emitting efficiency of the liquid crystal display.

Moreover, the temperature characteristics of various materials such as silicon substrate, insulating silicon oxide layers and metal layers can be well-controlled due to mature semiconductor manufacturing processing so that the fabricated device functions correctly in the electrical performance over a wide operation temperature range. Whereas, due to the difference between the coefficients of thermal expansion of the various materials and thus the variation of tension, the chips diced form the wafer may become deformed. This will seriously affect the optical flatness on the surface of the display and will, more seriously, damage or crack the display because of non-uniformity of the liquid crystal layer.

Therefore, in view of the aforementioned drawbacks of the conventional structure of LCOS or SIRLCD, there is need in providing an improved SIRLCD and a method for manufacturing the SIRLCD, in which a simple structure is provided so as to simplify the manufacturing processing and reduce the cost.

SUMMARY OF THE INVENTION

Accordingly, it is the primary object of the present invention to provide a reflective-type liquid crystal display, in which an interface module between an optical module and a control module is formed so that the optical module and the control module are independently fabricated and then combined by the interface module, thereby improving the product yield and reliability.

It is another object of the present invention to provide a reflective-type liquid crystal display, in which an interface module between various control modules is formed so that the control modules are combined to provide multiple functions.

It is still another object of the present invention to provide a method for manufacturing a reflective-type liquid crystal display, in which a plurality of conductive plugs are disposed on a substrate so as to form an interface module by etching the substrate to comprise tips after an optical module is formed on the substrate, so that the interface module is combined with a control module.

It is still another object of the present invention to provide a method for manufacturing a reflective-type liquid crystal display, in which a control module is manufactured by using semiconductor manufacturing processing to comprise contacts on the surface so as to combine with an interface module.

It is still another object of the present invention to provide a method for manufacturing a reflective-type liquid crystal display, in which a control module is formed on a substrate comprising conductive plugs so as to combine with other control modules through an interface module disposed on the substrate.

In order to achieve the foregoing objects, the present invention provides a reflective-type liquid crystal display, comprising: an optical module, comprising at least one liquid crystal layer and a plurality of pixel electrodes for displaying images; a control module, comprising a plurality of control circuits; and an interface module for connecting said optical module and said control module so that said optical module and said control module are manufactured independently so as to improve product yield and reduce fabrication cost.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein:

FIG. 2A to FIG. 2F are cross-sectional views showing manufacturing steps for forming an optical module and an interface module in accordance with one preferred embodiment of the present invention;

DETAILED DESCRIPTION OF THE INVENTION

The present invention providing an improved system integrated reflective-type liquid crystal display (SIRLCD) and a method for manufacturing such a SIRLCD can be exemplified by the preferred embodiments as described hereinafter.

Figure 2A:
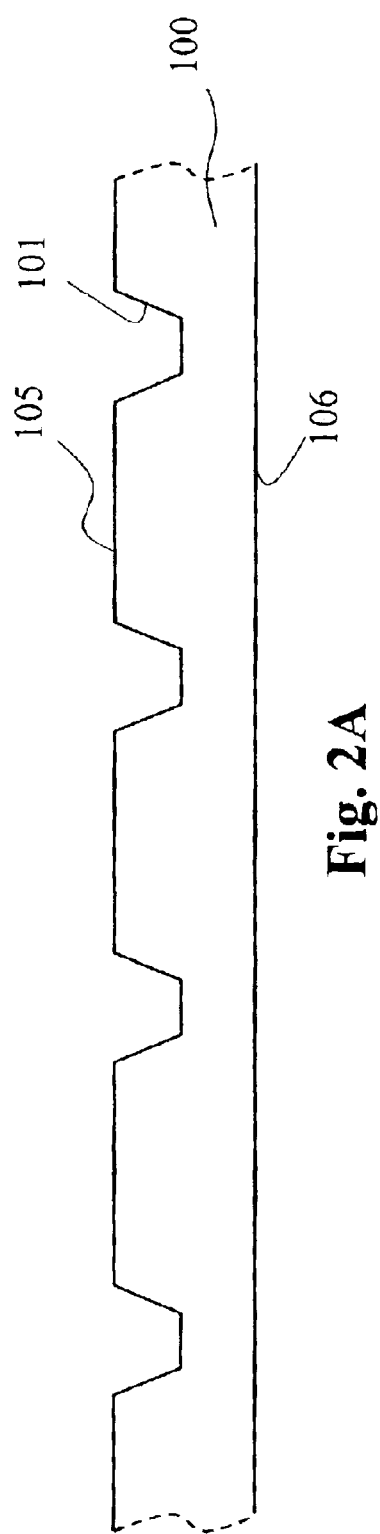
Figure 2B:
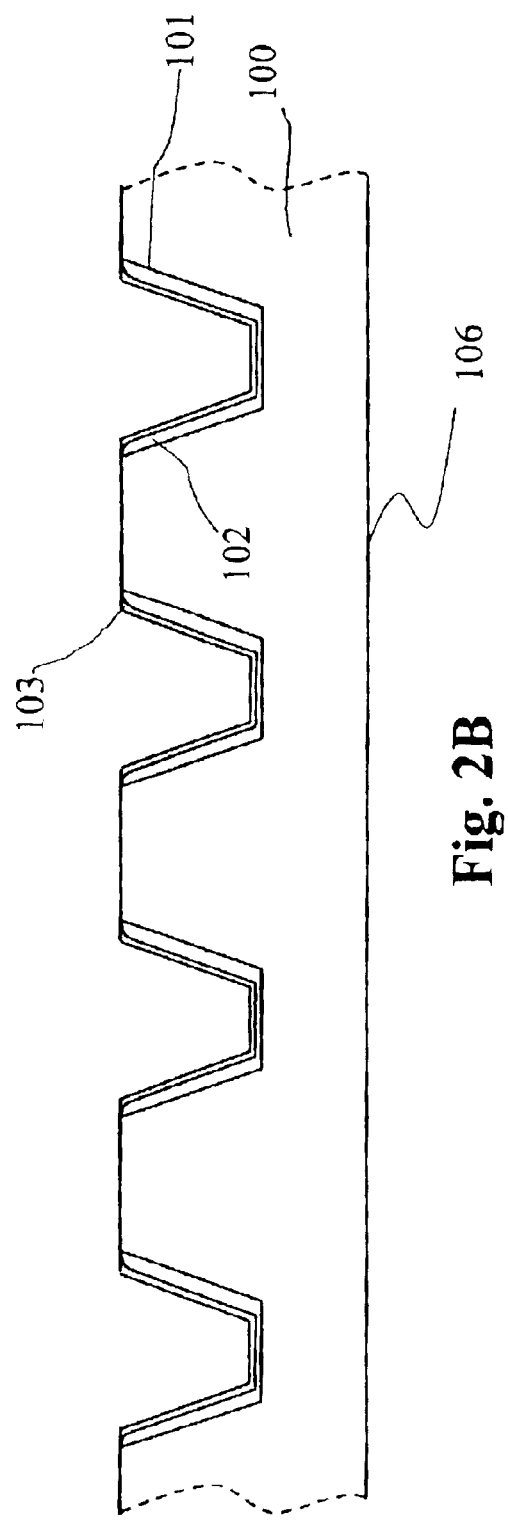

Please refer to FIG. 2A to FIG. 2F, which are cross-sectional views showing manufacturing steps for forming an optical module and an interface module in accordance with one preferred embodiment of the present invention. As shown in FIG. 2A, there is provided a substrate 100, on which a plurality of concaves 101 are formed by etching on pre-determined positions on the top surface 105 of the substrate 100. Then, silicon dioxide ($SiO_2$) is deposited on the surface of the concaves 101 to form first insulating layers 102 in the concaves 101. Moreover, silicon nitride ($Si_3N_4$) is deposited on the surface of the first insulating layers 102 to form second insulating layers 103 so as to further insure isolation, as shown in FIG. 2B. After that, a conductive material selectively formed of one of titanium (Ti), titanium nitride (TiN), tungsten (W), aluminum (Al), copper (Cu), gold (Au), silver (Ag) and combination thereof is filled into the concaves 101 to form conductive plugs 109, as shown in FIG. 2C.

Figure 2E:
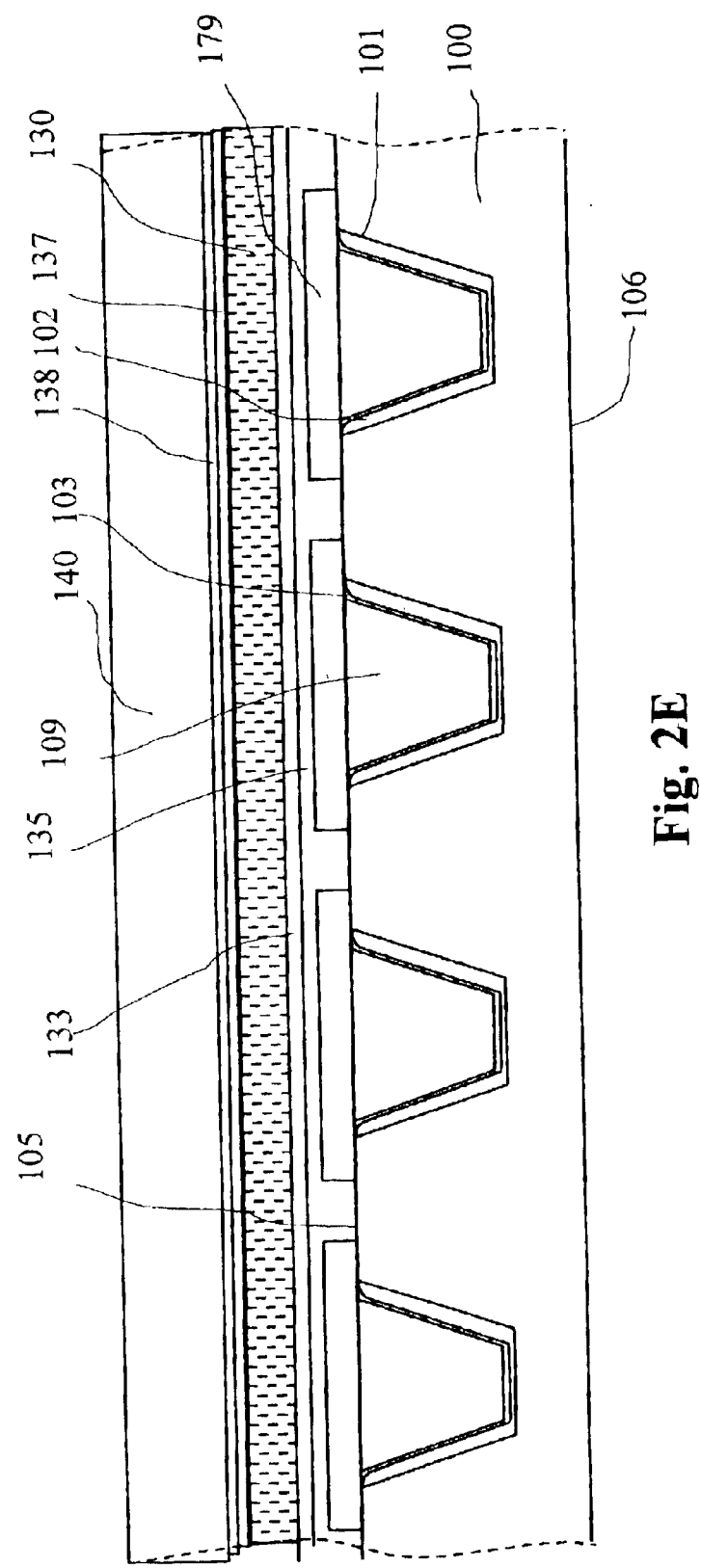

Subsequently, an optical module is constructed on the substrate 100 having the conductive plugs 109. The optical module comprises a plurality of pixel electrodes 179, alignment films 133 and 137, a transparent electrode 138, a transparent substrate 140 and a liquid crystal layer 130 sandwiched between the alignment films 133 and 137, as shown in FIG. 2D and FIG. 2E. More particularly, the pixel electrodes 179 are formed corresponding to the conductive plugs 109 on the substrate 100 to exhibit good light reflection. Then, an optical enhancement layer 135 is formed on the substrate 100 having the pixel electrodes 179, thereby flattening the surface and increasing light reflection on the pixel electrodes 179.

Figure 2F:
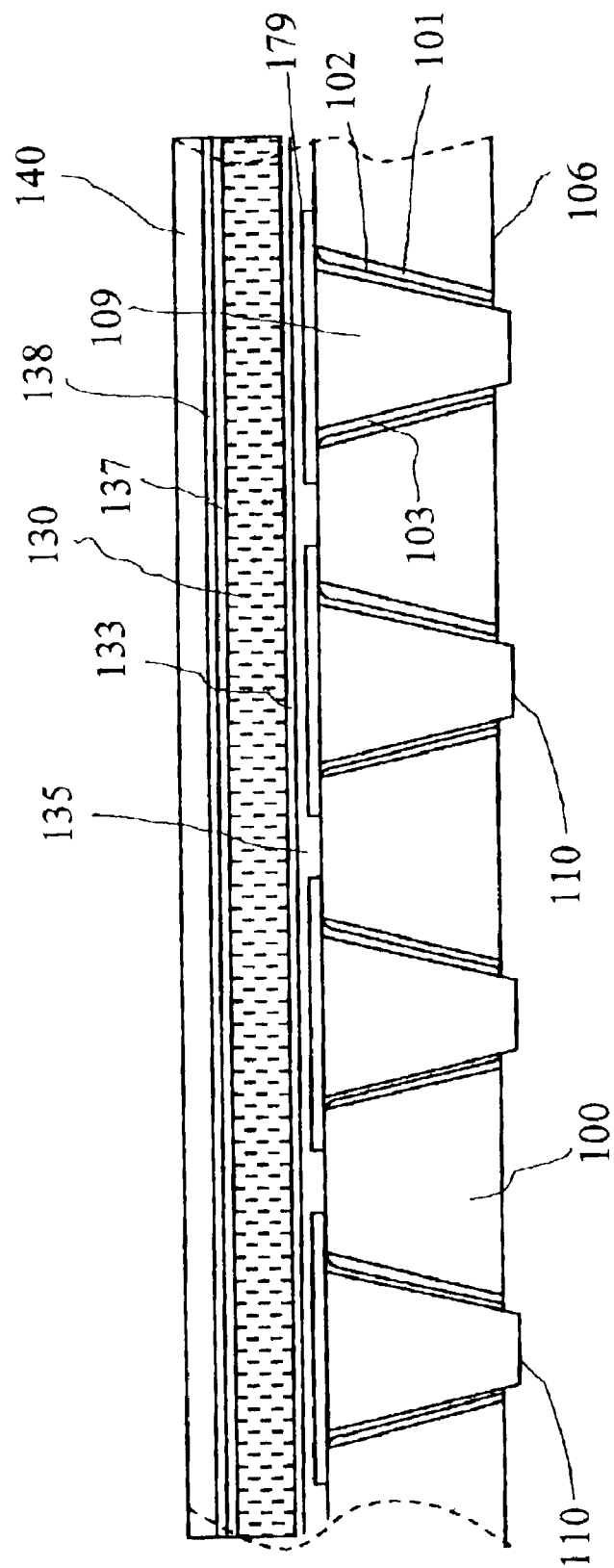

After the optical module is completed, the bottom surface 106 of the substrate 100 is performed with chemical mechanical polishing (CMP) and etching so that the bottom ends of the conductive plugs 109 are exposed on the bottom surface 106 of the substrate 100 to form tips 110, as shown in FIG. 2F.

The processing steps as shown in FIG. 2D and FIG. 2E can be completed by using conventional LCD manufacturing processing, which is well-developed to insure the quality and yield of the optical module. However, the processing steps as shown in FIGS. 2A to 2C and FIG. 2F are employed to form an interface module in the present invention so that the optical module is connected to various control modules through the interface module.

Figure 3:
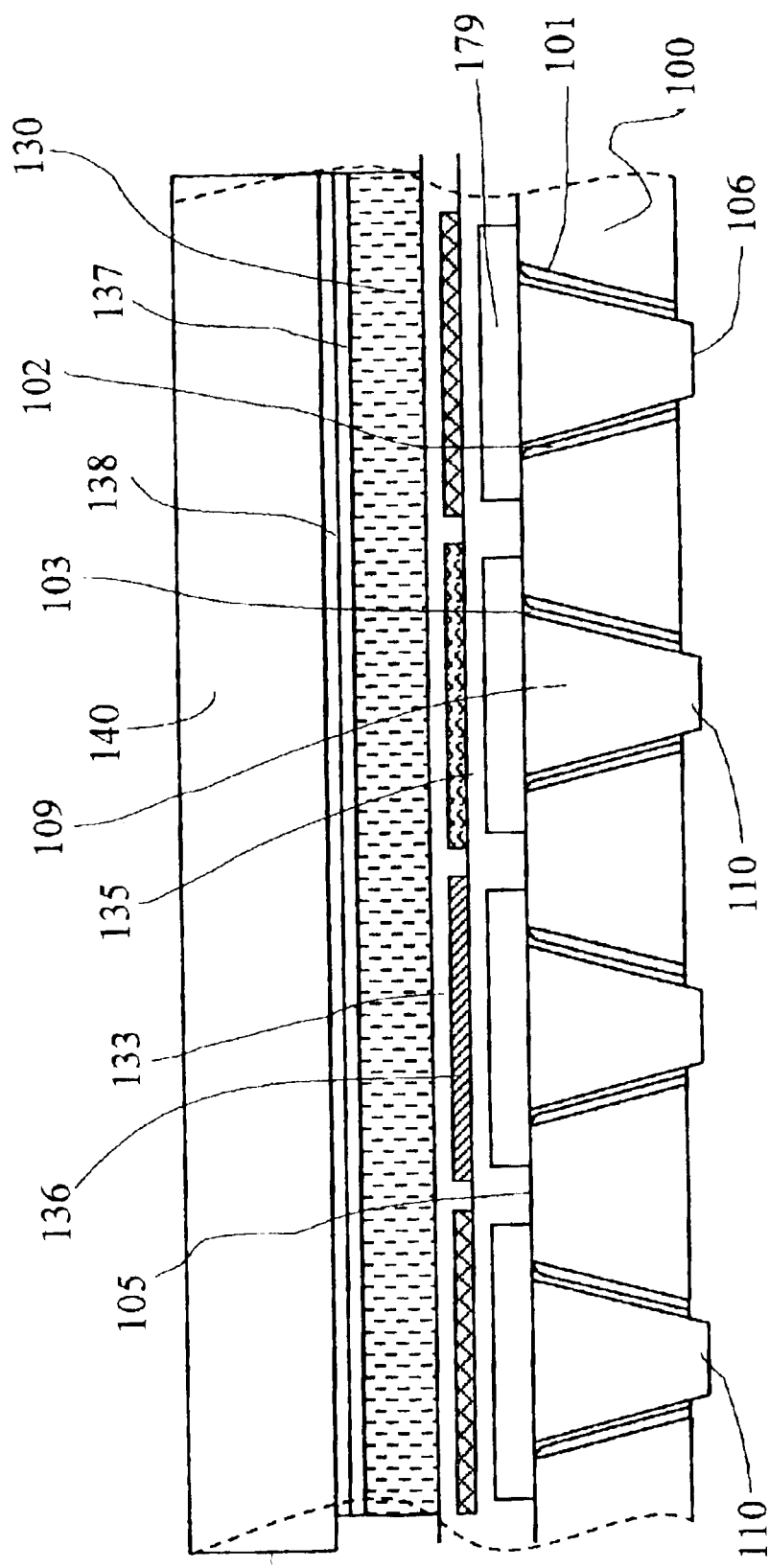
FIG. 3 is a cross-sectional view showing an optical module and an interface module in accordance with another embodiment of the present invention.

Moreover, please refer to FIG. 3, which is a cross-sectional view showing an optical module and an interface module in accordance with another embodiment of the present invention. The structure of the present embodiment is similar to the previous embodiment as shown in FIG. 2F except that a plurality of color filters 136 are formed sandwiched between the optical enhancement layer 135 and the alignment film 133. The color filters can be monochromatic filters or polychromatic filters corresponding to the pixel electrodes 179 so that the display can be a monochromatic, polychromatic or full-color display.

Figure 1:
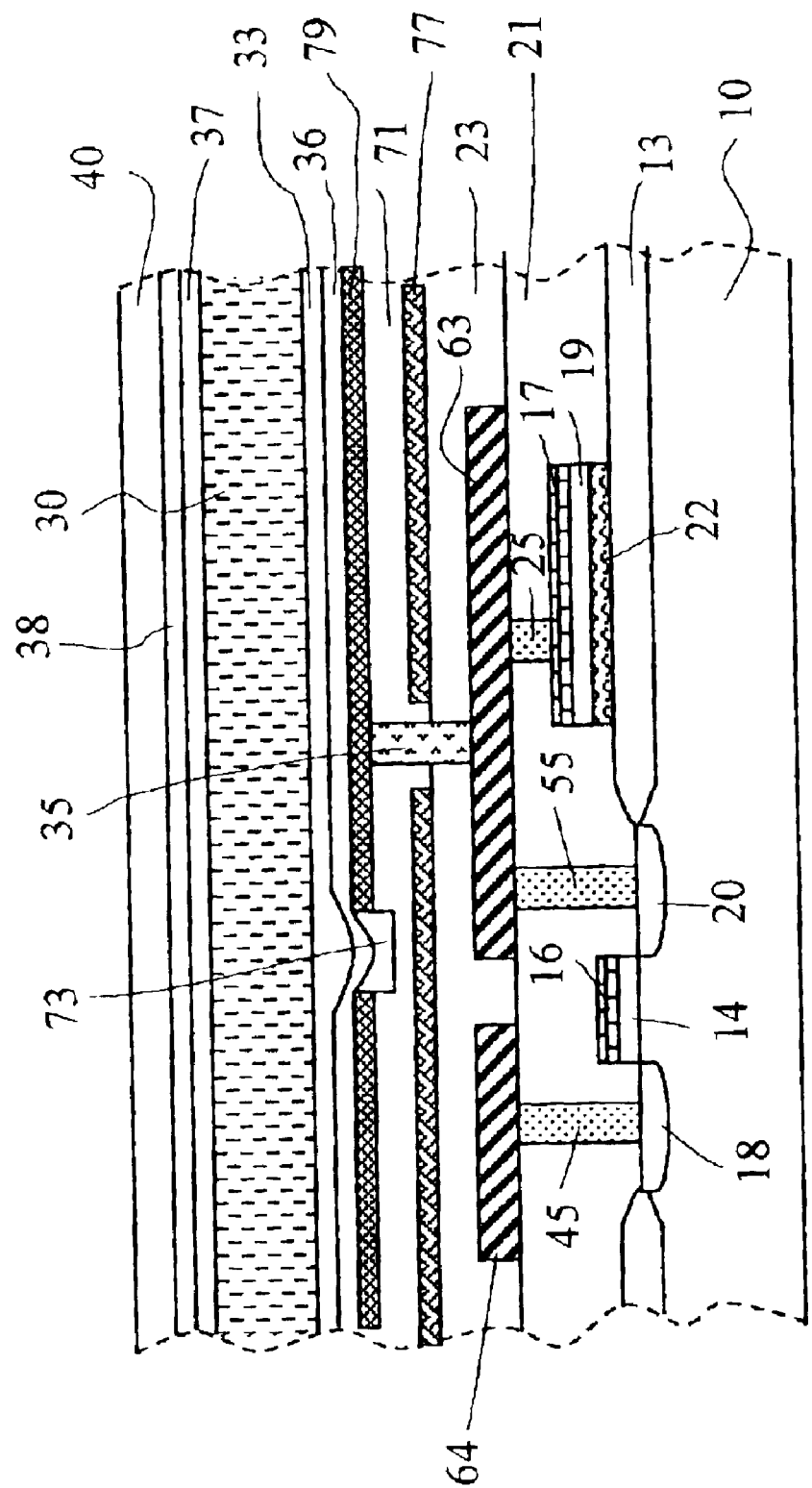
FIG. 1 is a cross-sectional view showing a conventional LCOS display or SIRLCD in accordance with the prior art.
Figure 4:
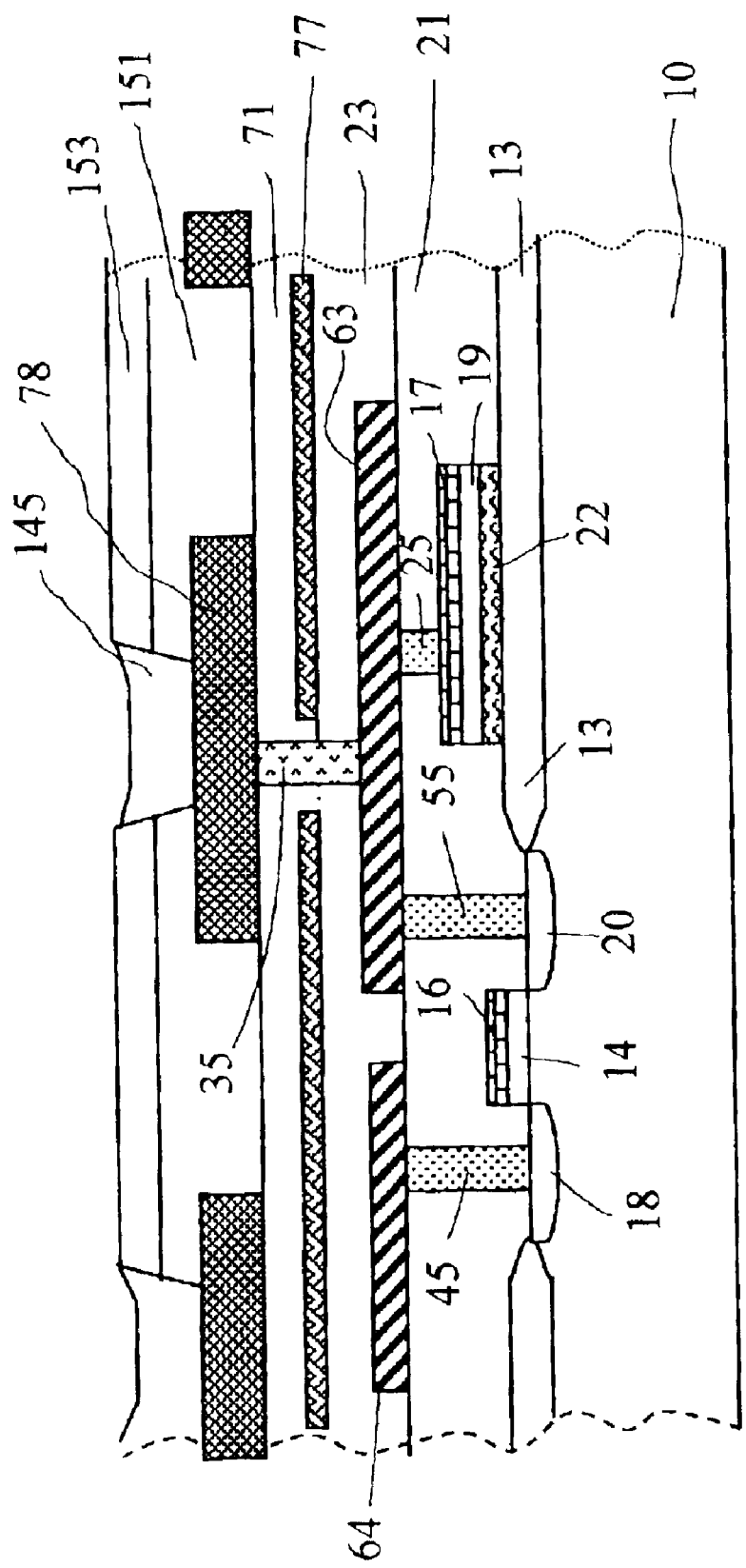
FIG. 4 is a cross-sectional view showing a control module in accordance with one preferred embodiment of the present invention.

Furthermore, please refer to FIG. 4, which is a cross-sectional view showing a control module in accordance with one preferred embodiment of the present invention. The control module of the present invention can be manufactured by using conventional semiconductor manufacturing processing with only a few modifications made to the conventional control module. In addition to the conventional control module, each of the pixel electrodes 79 (as shown in FIG. 1) is replaced with a metal pad 78 as a contact that is further connected to the control circuit through the via 35.

A third insulating layer 151 is deposited on the insulating layer 71 and the metal pads 78. The insulating layer 151 is formed of silicon dioxide, and then a silicon nitride protective layer 153 is formed thereon. An opening is formed on each of the metal pads 78 by etching the third insulating layer 151 and the protective layer 153. The opening on each of the metal pads 78 is filled with an adhesive conductive material 145 so that a control module is completed. More particularly, the adhesive conductive material 145 selectively comprises one of titanium, titanium nitride, solder, copper, mercury, amalgam, aluminum, silver epoxy, other conductive material and combination thereof.

Figure 5:
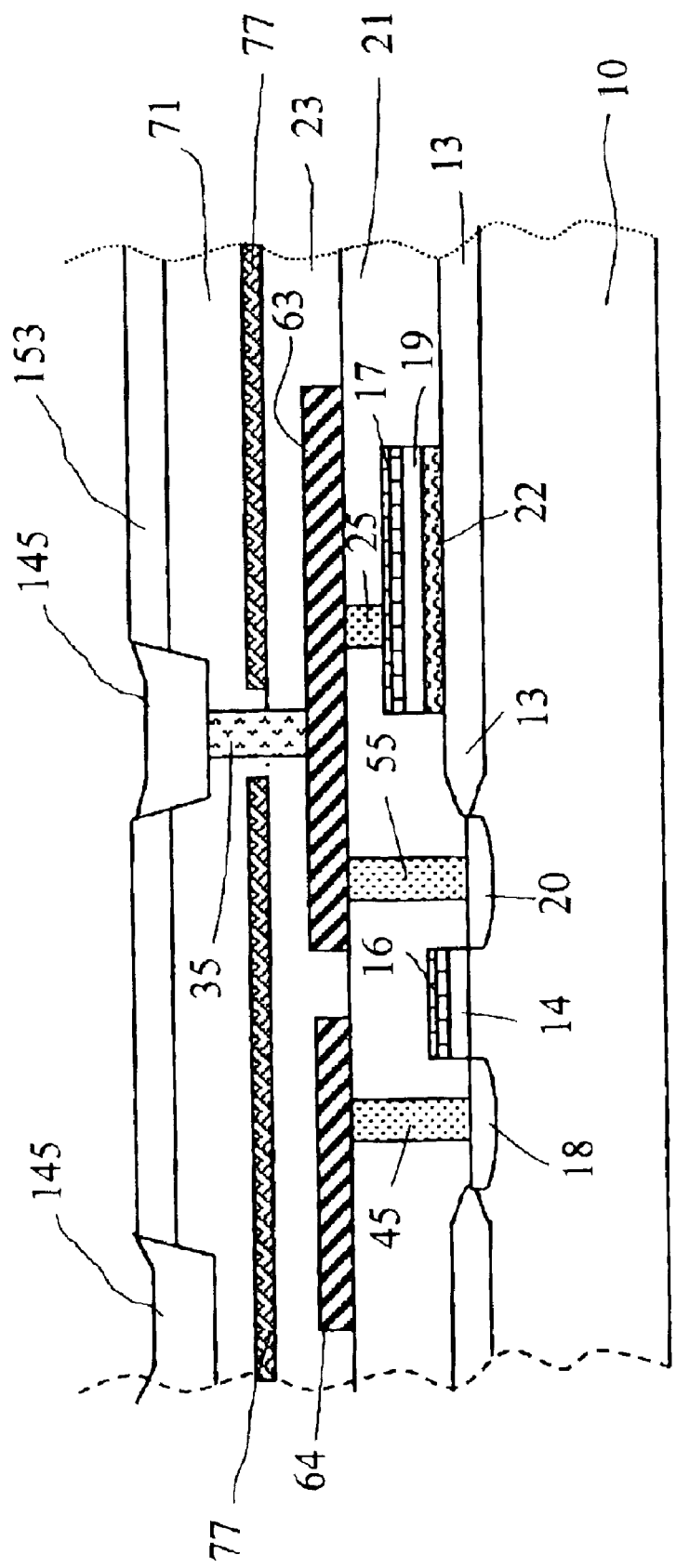
FIG. 5 is a cross-sectional view showing a control module in accordance with another embodiment of the present invention.

As shown in FIG. 5, the control module can be simplified by directly connecting the adhesive conductive material 145 and the via 35 without any metal pad. Furthermore, the light-shielding layer 77 and the via 35 can be omitted so that the adhesive conductive material 145 is directly connected to the conductive wire 63.

Figure 6:
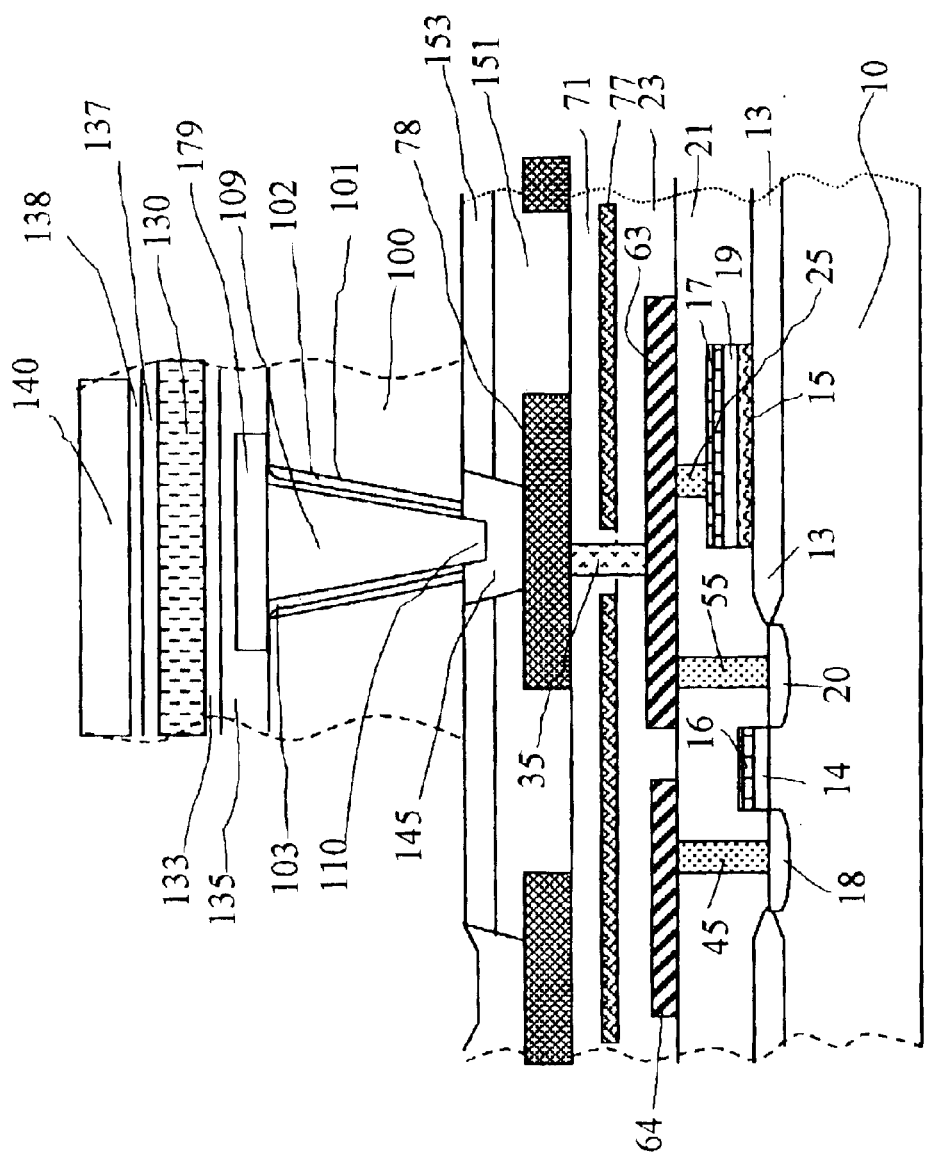
FIG. 6 is a cross-sectional view showing an improved SIRLCD in accordance with the present invention.

Please refer to FIG. 6, which is cross-sectional view showing an improved SIRLCD in accordance with the present invention. In FIG. 6, the optical module of the present invention is combined with the adhesive conductive material 145 of the control module with the tips 110 of the interface module, so that the pixel electrode 179 is electrically connected to the conductive wire 63 of the control module so as to form a complete LCOS display or SIRLCD. Moreover, an adhesive layer (not shown) is sandwiched between the substrate 100 and the control module so as to increase the adhesion between various modules.

Figure 7:
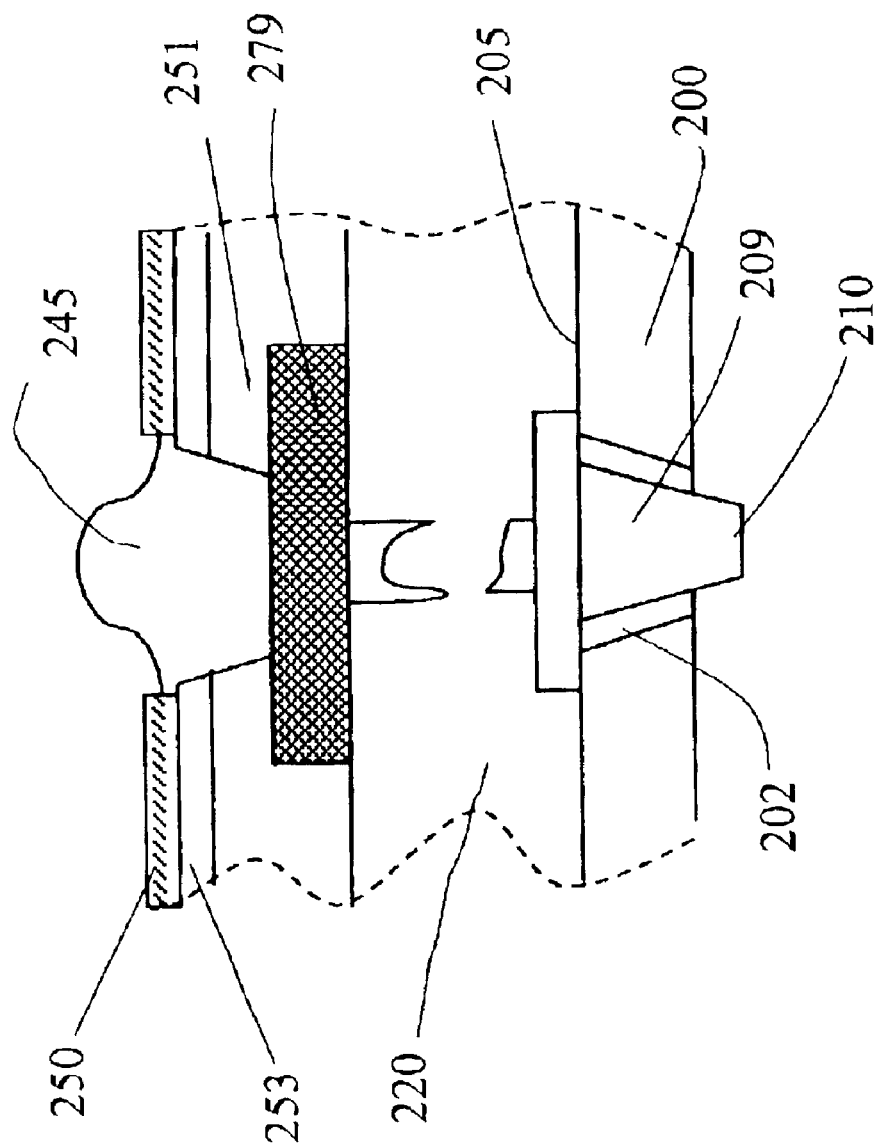
FIG. 7 is a cross-sectional view showing multiple control modules in accordance with the present invention.

Finally, please refer to FIG. 7, which is a cross-sectional view showing multiple control modules in accordance with the present invention. In FIG. 7, a substrate 200 with a structure as shown in FIG. 2C is formed. In the substrate, conductive plugs 209 are formed and isolated by insulating layers 202. Then, a pre-designed integrated circuit (IC) 220 is formed on the top surface 205 of the substrate 200. On pre-determined positions on the IC 220, there are formed a plurality of metal pads 279 for connecting the IC 200 and external devices. An insulating layer 251 and a protective layer 253 are formed on the IC 220 and the metal pads 279. An opening is formed on each of the metal pads 279 by etching the insulating layer 251 and the protective layer 253. The opening on each of the metal pads 279 is filled with an adhesive conductive material 245. More particularly, the adhesive conductive material 245 comprises selectively one of titanium, titanium nitride, solder, copper, mercury, amalgam, aluminum, silver epoxy, other conductive material and combination thereof. Tips 210 are formed at the bottom end of the conductive plugs 209 by performing chemical mechanical polishing and etching on the bottom surface of the substrate 200 so as to complete a structure of multiple control modules. Certainly, there can be formed an adhesive layer 250 on the multiple control modules so as to provide reliable adhesion between multiple control modules.

The LCOS display according the present invention exhibit multiple functions by connecting multiple control modules with various functions through the tips, thus we achieve a system integrated reflective-type liquid crystal display (SIRLCD).

Even though the current semiconductor manufacturing processing and the LCD manufacturing processing are well developed, the conventional LCOS and SIRLCD are still manufactured by directly bonding the control module and the optical module. Without a doubt, the product yield as well as the display quality is far from perfect. However, in the present invention, the optical module and the control module are manufactured independently and then are combined, so that the product yield as well as the display quality is improved and the fabrication cost is reduced.

According to the above discussion, it is apparent that the present invention discloses an improved system integrated reflective-type liquid crystal display (SIRLCD) and a method for manufacturing such a SIRLCD, in which a conductive plug is disposed on each of a plurality of pre-determined positions on a substrate so as to form an interface module for connecting an optical module by using well-developed LCD manufacturing processing and a control module by using well-developed semiconductor manufacturing processing, independently, thereby improving the product yield and reducing the fabrication cost. Therefore, the present invention has been examined to be new, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A reflective-type liquid crystal display, comprising:
an optical module, said optical module including at least one liquid crystal layer and a plurality of pixel electrodes for displaying images;
a control module including a plurality of control circuits; and,
an interface module for connecting said optical module and said control module so that said optical module and said control module are manufactured independently to improve product yield and reduce fabrication cost, said interface module having a substrate and a plurality of conductive plugs formed on corresponding pre-determined positions on said substrate, one end of each of said conductive plugs being connected to one of said pixel electrodes of said optical module while an opposing end is exposed on said substrate to form a tip.

2. The reflective-type liquid crystal display as recited in claim 1, wherein said conductive plugs are isolated from said substrate by an insulating layer.

3. The reflective-type liquid crystal display as recited in claim 2, wherein said insulating layer selectively comprises one of a silicon dioxide layer, a silicon nitride layer and the combination thereof.

4. The reflective-type liquid crystal display as recited in claim 1, wherein said conductive plugs include a conductive material selectively formed of one of titanium (Ti), titanium nitride (TiN), tungsten (W), aluminum (AL), Copper (Cu), gold (Au), silver (Ag) and a combination thereof.

5. The reflective-type liquid crystal display as recited in claim 1, wherein said plurality of control circuits of said control module are integrated on a chip, on which a plurality of contacts are disposed corresponding to said tips of said interface module.

6. The reflective-type liquid crystal display as recited in claim 5, wherein each of said plurality of contacts is a metal pad.

7. The reflective-type liquid crystal display as recited in claim 6, wherein an insulating layer is disposed on said control module with said metal pad, and a plurality of openings is disposed on said insulating layer for said tips of said interface module to connect to said metal pads through said openings.

8. The reflective-type liquid crystal display as recited in claim 7, wherein an adhesive conductive material is disposed on each of said openings.

9. The reflective-type liquid crystal display as recited in claim 8, wherein said adhesive conductive material selectively comprises one of titanium, titanium oxide, solder, copper, mercury, amalgam, aluminum, silver epoxy, other conductive material and a combination thereof.

10. A method for manufacturing a reflective-type liquid crystal display, comprising steps of:
providing a substrate;
forming a plurality of concaves by etching on each of pre-determined positions on said substrate;
forming a conductive plug comprising a conductive material in each of said concaves on said substrate;
forming an optical module comprising at least one liquid crystal layer and a plurality of pixel electrodes on said substrate comprising said conductive plugs, wherein each of said plurality of pixel electrodes is connected to one end of a corresponding one of said conductive plugs;
etching a bottom surface of said substrate so as to make the other ends of said plugs exposed on said bottom surface to form a plurality of tips;
providing a control module by using semiconductor manufacturing processing, wherein a plurality of contacts are formed corresponding to said tips; and
combining said control module and said substrate having said optical module by connecting said tips and said corresponding contacts.

11. The method as recited in claim 10, wherein said conductive plugs comprises a conductive material selectively formed of one of titanium (Ti), titanium nitride (TiN), tungsten (W), aluminum (Al), copper (Cu), gold (Au), silver (Ag) and combination thereof.

12. The method as recited in claim 10, wherein said conductive plugs are isolated from said substrate by an insulating layer.

13. The method as recited in claim 12, wherein said insulating layer selectively comprises one of a silicon dioxide layer, a silicon nitride layer and the combination thereof.

14. The method as recited in claim 10, wherein each of said plurality of contacts is a metal pad.

15. The method as recited in claim 10, further comprising steps of:
forming a protective layer on a surface of said control module with said contacts on the same side; and
forming an opening corresponding to said contacts on said protective layer.

16. The method as recited in claim 15, wherein an adhesive conductive material is disposed on said opening.

17. The method as recited in claim 16, wherein said adhesive conductive material selectively comprises one of titanium, titanium nitride, solder, copper, mercury, amalgam, aluminum, silver epoxy, other conductive material and combination thereof.

18. The method as recited in claim 10, wherein an adhesive layer is formed on said surface of said control module with said contacts so as to increase the adhesion between said modules.

19. The method as recited in claim 10, wherein a plurality of tips are formed on a bottom surface of said control module.

20. The method as recited in claim 19, further comprising steps of:
providing a second control module by using semiconductor manufacturing processing, wherein a plurality of contacts are formed on said second control module corresponding to said tips on said control module; and
combining said control module and said second control module by connecting said tips and said corresponding contacts.

21. The method as recited in claim 20, wherein an adhesive layer is formed on a top surface of said second control module so as to increase the adhesion between said second control module and said control module.

* * * * *